(12) United States Patent
Tulloch et al.

(10) Patent No.: US 11,286,031 B2
(45) Date of Patent: Mar. 29, 2022

(54) ASSEMBLY WITH CAPTIVE NUT

(71) Applicant: AIRBUS OPERATIONS LIMITED, Bristol (GB)

(72) Inventors: William Tulloch, Bristol (GB); Pat Broomfield, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 631 days.

(21) Appl. No.: 16/219,095

(22) Filed: Dec. 13, 2018

(65) Prior Publication Data
US 2019/0176961 A1 Jun. 13, 2019

(30) Foreign Application Priority Data
Dec. 13, 2017 (GB) ...................................... 1720722

(51) Int. Cl.
| B64C 3/34 | (2006.01) |
| B64D 45/02 | (2006.01) |
| B64D 37/02 | (2006.01) |
| B64C 3/32 | (2006.01) |
| B64D 27/26 | (2006.01) |
(Continued)

(52) U.S. Cl.
CPC ................ *B64C 3/34* (2013.01); *B64C 3/32* (2013.01); *B64D 27/26* (2013.01); *B64D 37/02* (2013.01); *B64D 45/02* (2013.01); *F16B 35/00* (2013.01); *F16B 37/048* (2013.01); *F16B 37/14* (2013.01); *F16B 37/145* (2013.01); *B64D 2027/264* (2013.01); *F16B 5/0642* (2013.01);
(Continued)

(58) Field of Classification Search
CPC .. B64C 3/34; B64C 3/32; B64D 27/12; B64D 37/32; B64D 45/02; B64D 27/26; B64D 2027/264; B64D 37/02; F16B 37/14; F16B 35/00; F16B 37/145
See application file for complete search history.

(56) References Cited

U.S. PATENT DOCUMENTS 9,163,656 B2 * 10/2015 Asahara ................ F16B 43/001
2014/0373359 A1   12/2014 Schomaker et al.
(Continued)

FOREIGN PATENT DOCUMENTS

| CN | 201347933 | 11/2009 |
| EP | 0053634 | 6/1982 |
(Continued)

OTHER PUBLICATIONS

Extended European Search Report for European Application No. 18212221.8, dated May 13, 2019, 10 pages.
(Continued)

*Primary Examiner* — Richard R. Green
*Assistant Examiner* — Steven J Shur
(74) *Attorney, Agent, or Firm* — Nixon & Vanderhye P.C.

(57) ABSTRACT

An assembly with an aircraft fuel tank is disclosed having a captive nut with an internal thread, a secondary structure, and a fastener which secures the secondary structure to the fuel tank. The fastener has a shaft which passes through the secondary structure and has an external thread coupled to the internal thread of the captive nut. The fuel tank has a fuel tank element with a hole, and the captive nut has a sleeve which is located in the hole with an interference fit between an outer surface of the sleeve and an inner surface of the wall of the hole.

20 Claims, 10 Drawing Sheets

(51) Int. Cl.
    *F16B 35/00*     (2006.01)
    *F16B 37/14*     (2006.01)
    *F16B 37/04*     (2006.01)
    *F16B 33/00*     (2006.01)
    *F16B 5/06*     (2006.01)
    *F16B 19/02*     (2006.01)

(52) U.S. Cl.
    CPC ............ *F16B 19/02* (2013.01); *F16B 33/002* (2013.01); *F16B 33/004* (2013.01)

(56) References Cited

U.S. PATENT DOCUMENTS

2015/0252828 A1    9/2015   Hurst
2015/0300397 A1*  10/2015   Dobbin .................. B64D 45/02
                                                                                            411/372.6

FOREIGN PATENT DOCUMENTS

| EP | 0053634 A1 | * | 6/1982 | ............. F16B 19/10 |
| EP | 0 269 458 | | 6/1988 | |
| EP | 3 279 090 | | 2/2018 | |
| GB | 2 212 580 | | 7/1989 | |
| GB | 2226801 | | 7/1990 | |
| GB | 2226801 A | * | 7/1990 | ............ F16B 5/0208 |
| WO | 2018/192787 | | 10/2018 | |

OTHER PUBLICATIONS

Extended European Search Report for European Application No. EP20159433.0, eight pages, dated May 15, 2020.
Combined Search and Examination Report for GB Application No. 1720722.6 dated Feb. 28, 2018, 12 pages.
GB Search Report for GB Application No. 1720722.6 dated Sep. 7, 2018, 2 pages.
U.S. Appl. No. 16/201,419, filed Nov. 27, 2018.

* cited by examiner

ASSEMBLY WITH CAPTIVE NUT

CROSS RELATED APPLICATION

This application claims priority to United Kingdom (GB) patent application 1720722.6, filed Dec. 13, 2017, the entire contents of which are hereby incorporated by reference.

FIELD OF THE INVENTION

The present invention relates to an assembly comprising a primary structure; a secondary structure; and a fastener which secures the secondary structure to the primary structure. The fastener has a captive nut with an internal thread. Optionally the primary structure is an aircraft fuel tank.

BACKGROUND OF THE INVENTION

GB-A-2212580 discloses a fastener for joining an aircraft skin panel made of composite material to a substructural member, comprising a bevel headed countersunk bolt and captive nut. The captive nut is held captive on the underside of the substructural member by means of rivets.

A problem with the arrangement of GB-A-2212580 is that the rivets weaken the substructural member, and complicate the assembly process.

SUMMARY OF THE INVENTION

A first aspect of the invention provides an aircraft fuel tank assembly as set out in claim 1. A fastener secures a secondary structure to the fuel tank. The fastener has a captive nut with a sleeve which is located in a hole with an interference fit between an outer surface of the sleeve and an inner surface of the wall of the hole.

The interference fit between the two abutting surfaces enables the captive nut to be installed quickly and easily, without requiring rivets as in GB-A-2212580.

The secondary structure may be an engine pylon, a flight control surface, a wing tip device or any other secondary structure.

The secondary structure may be inside the fuel tank, but more typically the secondary structure is outside the fuel tank.

The captive nut may be outside the fuel tank, but more typically the captive nut is inside the fuel tank.

Typically the sleeve is a metallic sleeve and the fuel tank element is a metallic fuel tank element.

The fuel tank element may be a fuel tank wall, such as a lower cover of an aircraft wing. More typically the fuel tank comprises a fuel tank wall, such as a lower cover of an aircraft wing, the fuel tank element is a fitting which is inside the fuel tank and carried by the fuel tank wall, and the shaft passes through the secondary structure and the fuel tank wall.

Optionally the fuel tank wall is formed from a fibre-reinforced composite material (such as carbon fibre reinforced polymer) and the fitting is formed from a metallic material.

Optionally the sleeve is a metallic sleeve with a sleeve axis; the fuel tank element is a metallic fuel tank element; the outer surface of the sleeve meets the inner surface of the wall of the hole at an interface; and the interface has a circular cross-section at all positions along the sleeve axis. Alternatively the cross-section of the interface may be non-circular—for instance elliptical, square or formed with a tab.

A further aspect of the invention provides an assembly according to claim 10 and a method according to claim 20. A fastener secures a secondary structure to a primary structure. The fastener has a captive nut with a sleeve which is located in a hole with an interference fit between an outer surface of the sleeve and an inner surface of the wall of the hole. The sleeve is a metallic sleeve with a sleeve axis, the element is a metallic element, the outer surface of the sleeve meets the inner surface of the wall of the hole at an interface, and the interface has a circular cross-section at all positions along the sleeve axis.

The interference fit between the two abutting surfaces enables the captive nut to be installed without requiring rivets as in GB-A-2212580. Furthermore, the circular cross-section of the interface enables the sleeve and hole to be manufactured and fitted quickly and easily.

The further aspect of the invention provides an assembly and associated method, which can be used not only for an aircraft fuel tank, but also in other applications. For instance the primary structure may be a fuel tank of another vehicle such as a rocket or ship, or any other structure which requires a captive nut to be easily fitted.

The following comments apply to all aspects of the invention.

The interface preferably has a circular cross-section at all positions along the sleeve axis. The interface may be conical, or generally cylindrical with a series of circular ridges or grooves. However more preferably the interface is cylindrical. Typically the cylindrical interface is smooth, without any macroscopic protrusions or recesses.

Typically the surface of the wall of the hole is cylindrical with an inner diameter which defines the internal dimension of the hole; and the outer surface of the sleeve is cylindrical with an outer diameter which defines the equivalent external dimension of the sleeve.

Typically the interference fit provides a frictional force which is the only force which prevents the sleeve from rotating within the hole.

The sleeve may be forced into the hole by a force exceeding 1,000 N (1 kN), 5,000 N (5 kN) or 10,000 N (10 kN).

Preferably the shaft has a maximum outer diameter greater than 10 mm and/or an axial tensile strength greater than 100,000 N (100 kN).

The sleeve may be forced into the hole by pushing it into the hole, or by pulling it into the hole.

Typically the element is formed from a first metallic material, and the sleeve of the captive nut is formed from a second metallic material which has a higher Young's modulus than the first metallic material. For instance the first and second metallic materials may be Aluminium and stainless steel respectively, or Aluminium and Titanium respectively.

In one embodiment the shaft passes through a bore in the secondary structure which has the same diameter as the hole in which the sleeve is located. In this case the shaft typically has a relatively wide base, and a relatively narrow tip which carries the external thread. Alternatively the shaft may be fitted with a second sleeve.

In another embodiment the shaft passes through a bore in the secondary structure which has a smaller diameter than the hole in which the sleeve is located. In this case the shaft can have a uniform width.

Typically the wall of the hole has a compressed region in contact with the sleeve, preferably in elastic compression.

The captive nut may have an open top or it may be entirely housed within the hole, but more preferably it comprises a cap which encloses a distal end of the shaft.

Optionally the captive nut comprises a shoulder which contacts the fuel tank element or the element of the primary structure and acts as a stop which prevents the captive nut from being pushed further into the hole.

Preferably the hole is a through-hole rather than a blind hole. In other words the hole preferably passes through a full thickness of the element.

Typically the shaft of the fastener passes through the fuel tank element or the element of the primary structure, and through the secondary structure. Optionally the shaft of the fastener passes through a full thickness of the fuel tank element or the element of the primary structure, and through a full thickness of the secondary structure.

The assembly may be installed in an aircraft—for instance to secure a secondary element to a fuel tank in the wing, tail or fuselage.

The assembly may be installed in an aircraft wing—either the main wing or the horizontal tail plane.

Optionally the captive nut comprises a first spherical surface; and the assembly further comprises a washer with a second spherical surface which contacts the first spherical surface, wherein the washer is compressed between the first spherical surface and the element. The first spherical surface may be convex and the second spherical surface concave, or vice versa.

BRIEF DESCRIPTION OF THE DRAWINGS

Embodiments of the invention will now be described with reference to the accompanying drawings, in which.

DETAILED DESCRIPTION OF EMBODIMENT(S)

Figure 5:
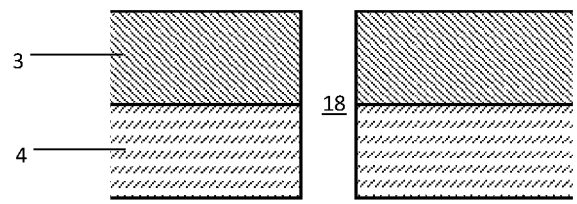
FIG. 5 shows a bolt being inserted.
Figure 5:
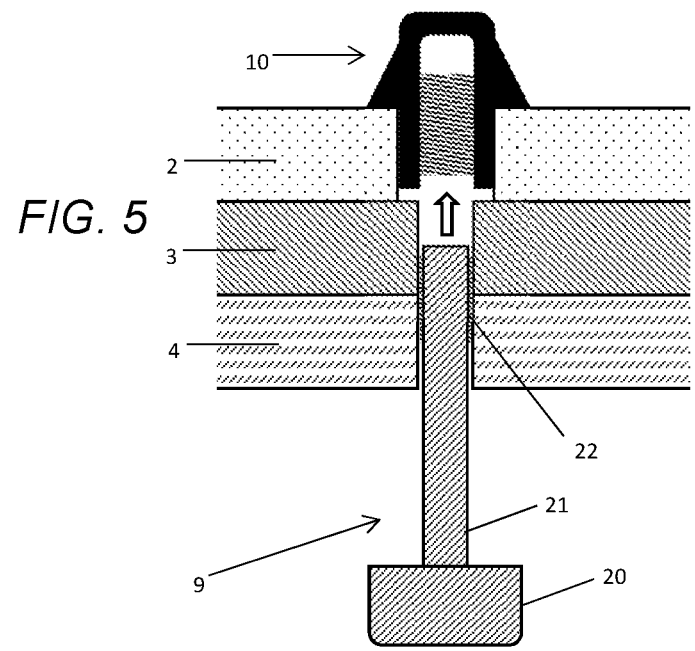
Figure 6:
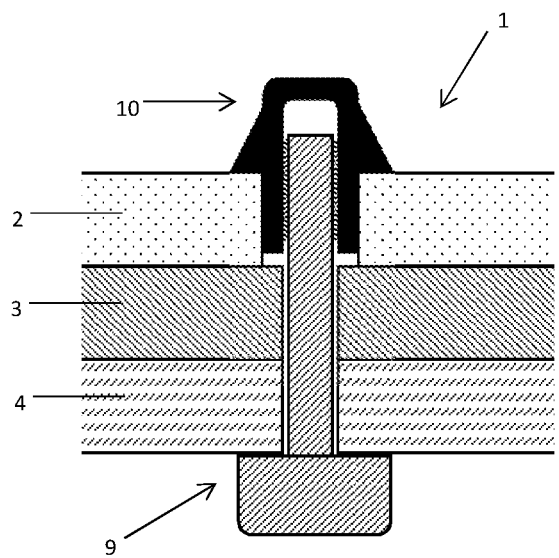
FIG. 6 shows an assembly according to a first embodiment of the invention.

The assembly 1 of FIG. 6 comprises a fitting 2, a panel 3, and a plate 4. The fitting 2 and the panel 3 together constitute a primary structure and the plate 4 comprises a secondary structure. A fastener secures the plate 4 to the primary structure 2, 3. The fastener comprises a bolt 9 and a captive nut 10. A method of manufacturing the assembly is shown in FIGS. 1-5.

Figure 1:
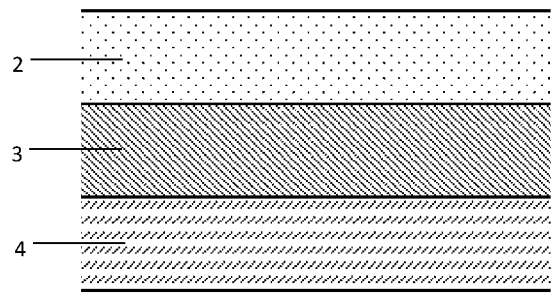
FIG. 1 is a cross-sectional view of a stack.
Figure 2:
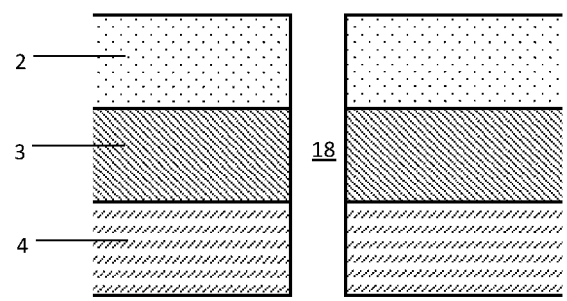
FIG. 2 shows a bore drilled in the stack.
Figure 3:
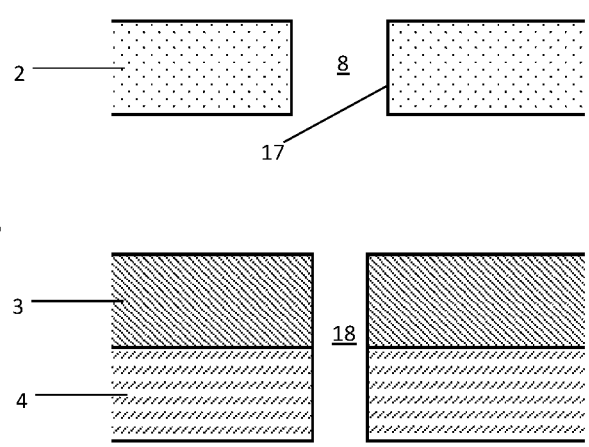
FIG. 3 shows a widened hole formed in the fitting.

In a first step shown in FIG. 1, the fitting 2, panel 3 and plate 4 are arranged in a stack. Next the fitting 2, panel 3 and plate 4 are stack drilled with a first drill bit to form a bore 18 which passes through all three components as shown in FIG. 2. The stack is then disassembled as shown in FIG. 3 and the hole in the fitting 2 is enlarged with a second drill bit so that it becomes wider than the bore 18 as shown in FIG. 3. The resultant widened hole is indicated with reference number 8. The wall of the hole 8 has a cylindrical inner surface 17. Note that the hole 8 is a through-hole rather than a blind hole. In other words the hole 8 passes through a full thickness of the fitting.

Figure 4:
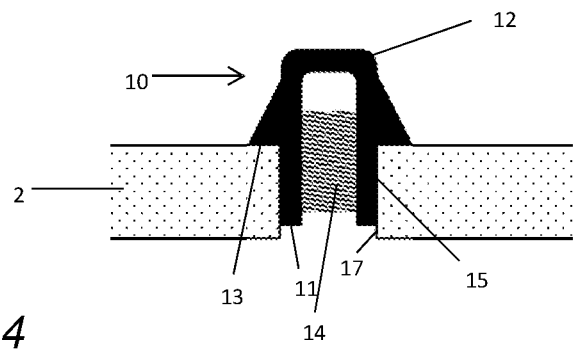
FIG. 4 shows a captive nut fitted into the widened hole.

As indicated in FIG. 4, the captive nut 10 has a sleeve 11, a cap 12 and a flange with a shoulder 13. The internal surface of the cap 12 and the sleeve 11 is formed with an internal thread 14.

The captive nut 10 is forced into the hole 8 until the shoulder 13 of the flange contacts the upper face of the fitting 2 as shown in FIG. 4. The shoulder 13 contacting the fitting 2 acts as a stop which prevents the captive nut 10 from being pushed further into the hole 8.

Figure 10:
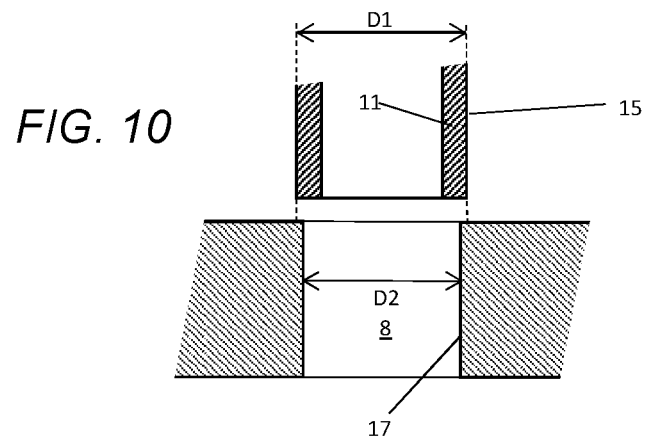
FIG. 10 is an enlarged view of the sleeve before it is fitted in the hole.

The outer surface 15 of the sleeve 11 is cylindrical with an outer diameter D1. As shown in FIG. 10, before the sleeve 11 is forced into the hole 8, the surface 17 of the wall of the hole 8 has an inner diameter D2 which is less than the outer diameter D1 of the sleeve. The fitting 2 is formed from a first metallic material such as Aluminium, and the sleeve 11 of the captive nut is formed from a second metallic material, such as stainless steel, which has a higher Young's modulus than the first metallic material and hence is less easy to compress than the first metallic material.

The captive nut 10 is forced into the hole 8, either by pushing it into the hole 8 with a hydraulic press or by pulling it into the hole 8 with a tool screwed into the captive nut 10. As the sleeve 11 is forced into the hole, the wall of the hole 8 deforms elastically to accommodate the sleeve 11 and form an interference fit shown in FIG. 4 between the two abutting cylindrical surfaces 17, 15.

Figure 11:
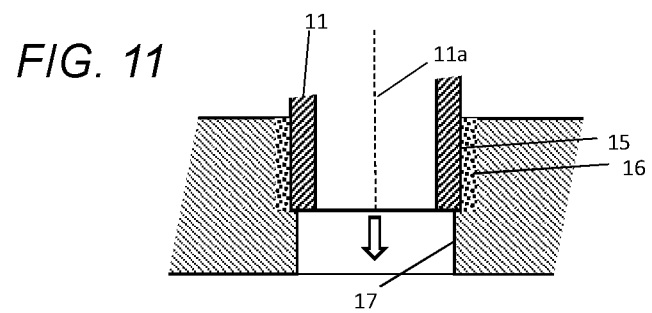
FIG. 11 shows the sleeve being forced into the hole.

FIG. 11 shows the sleeve being forced into the hole 8. The elastic deformation creates a compressed surface region 16 next to the cylindrical surface 17. This compressed surface region 16 improves the fatigue resistance of the fitting 2.

Optionally the sleeve 11 may be frozen before installation, and/or the fitting 2 heated before installation so that there is a temperature differential which makes it easier to force the sleeve into the hole, and the interference fit becomes tighter as the parts expand and/or contract as they reach thermal equilibrium. However it has been found that this is not generally necessary so the sleeve can be forced into the hole with all parts at the same temperature.

By way of example, the sleeve 11 may be forced into the hole 8 by a force exceeding 1,000 N, 5,000 N or 10,000 N.

Figure 12:
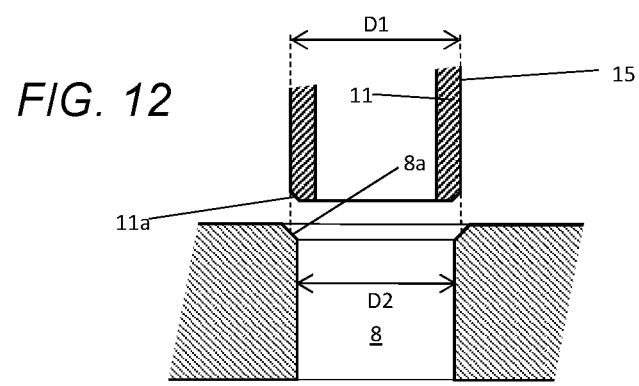
FIG. 12 shows a sleeve and hole with chamfered edges.

FIG. 12 shows an alternative geometry for the tip of the sleeve 11 and the upper edge of the hole 8—in this case the tip of the sleeve is formed with a chamfered edge 11a and the upper edge of the hole 8 is formed with a complementary chamfered edge 8a. These chamfered edges 11a, 8a provide a lead-in for the sleeve into the hole.

Next, the stack is reassembled as shown in FIG. 5, this time with the captive nut 10 secured to the fitting 2.

As indicated in FIG. 5, the bolt 9 comprises a head 20, and a shaft 21 with an external thread 22 at its distal end. After the stack has been reassembled as in FIG. 5, the shaft 21 is pushed through the panel 3 and plate 4 and screwed into the captive nut 10, so that the external thread 22 of the shaft is coupled to the internal thread 14 of the captive nut.

As shown in FIG. 6, after being screwed in, the shaft 21 passes through a full thickness of the fitting 2 and the panel 3 (the primary structure) and the shaft 21 also passes through a full thickness of the plate 4 (the secondary structure which is secured to the primary structure by the bolt 9).

The cap 12 of the captive nut encloses the distal end of the shaft 21, and the intimate contact between the two abutting cylindrical surfaces 17, 15 creates a liquid-tight seal.

Figure 13:
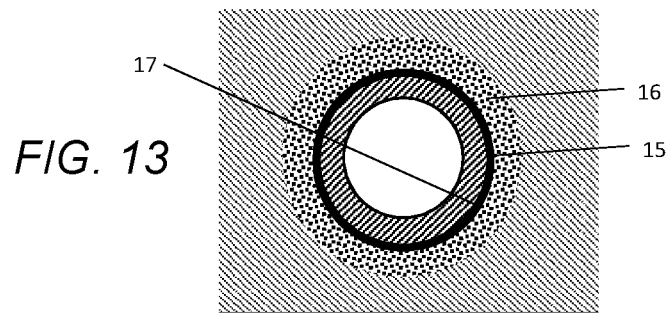
FIG. 13 is a cross-sectional view showing the circular cross-section of the assemblies of FIGS. 6 and 9.

The sleeve has a sleeve axis 11a shown in FIG. 11, and FIG. 13 is a cross-sectional view of the assembly transverse to this sleeve axis showing the interface where the cylindrical outer surface 15 of the sleeve meets the cylindrical inner surface 17 of the wall of the hole. Since the surfaces 15, 17 are cylindrical, the interface has a circular cross-section at all positions along the sleeve axis 11a, with a diameter D1 which does not vary along the sleeve axis. The cylindrical interface is smooth, without any macroscopic protrusions or recesses.

This circular cross-section means that the frictional force provided by the interference fit between the two abutting cylindrical surfaces 17, 15 is the only force which prevents the captive nut 10 from rotating within the hole 8 as the shaft 21 of the bolt is screwed into the captive nut 10. The frictional force also resists axial push-out of the captive nut during installation of the bolt.

Figure 14:
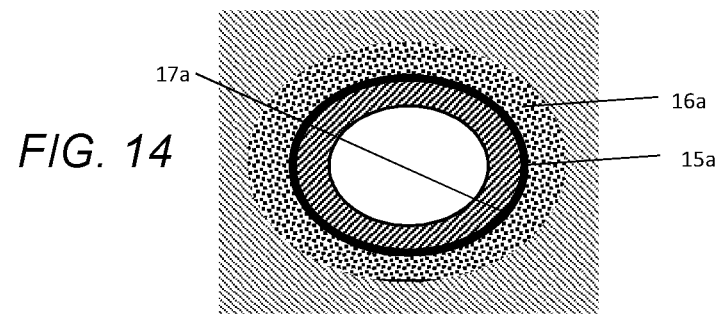
FIG. 14 is a cross-sectional view showing an assembly according to a further embodiment of the invention with an elliptical cross-section.

FIG. 14 shows an alternative cross-section transverse to the sleeve axis 11a—with equivalent features given the same number appended with the letter a. In this case the surfaces 15a, 17a and the compressed region 16a have an elliptical cross-section. So the interference fit between the two abutting surfaces 17a, 15a prevents the captive nut from being pushed out axially, and the elliptical shape of the interface prevents the captive nut 10 from rotating within the hole 8 as the shaft 21 is screwed into the captive nut 10. This is less preferred than the circular cross-section of FIG. 13 because it is not possible to form the hole by a conventional drill, and because it requires the elliptical captive nut to be oriented at the correct angle before the sleeve is inserted.

Figure 15:
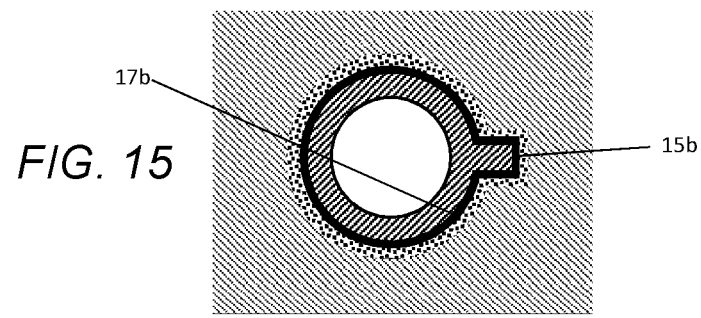
FIG. 15 is a cross-sectional view showing an assembly according to a further embodiment of the invention with an irregular cross-section.

FIG. 15 shows an alternative cross-section transverse to the sleeve axis 11a—with equivalent features given the same number appended with the letter b. In this case the surfaces 15b, 17b and the compressed region have an irregular cross-section with a tab which fits into a slot. So the interference fit between the two abutting surfaces 17b, 15b prevents the captive nut from being pushed out axially, and the tab prevents the captive nut 10 from rotating within the hole 8 as the shaft 21 is screwed into the captive nut 10. This is less preferred than the circular cross-section of FIG. 13 because it requires an extra machining step to form the slot in the hole, and the tab must be lined up with the slot before the sleeve is inserted.

Figure 7:
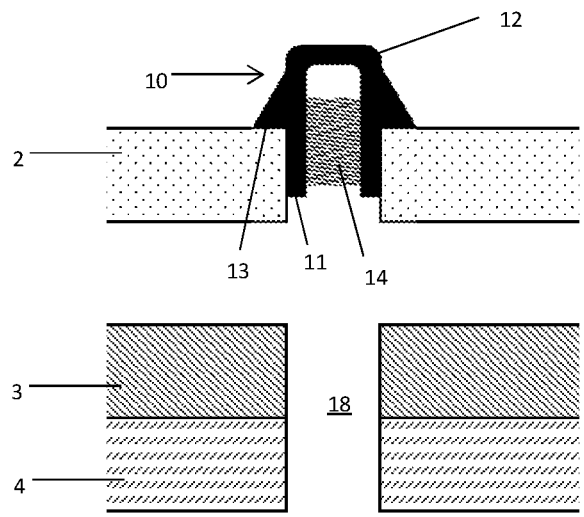
FIG. 7 shows a captive nut fitted into a hole.
Figure 8:
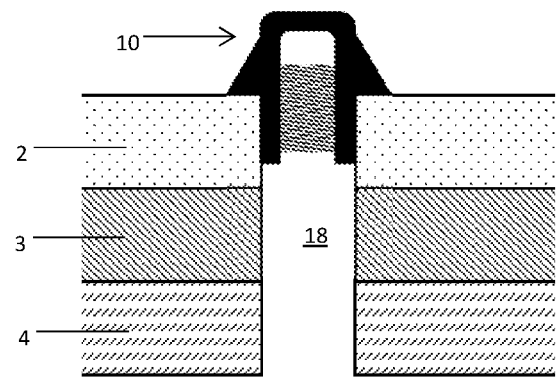
FIG. 8 shows a re-assembled stack with the captive nut in place.
Figure 9:
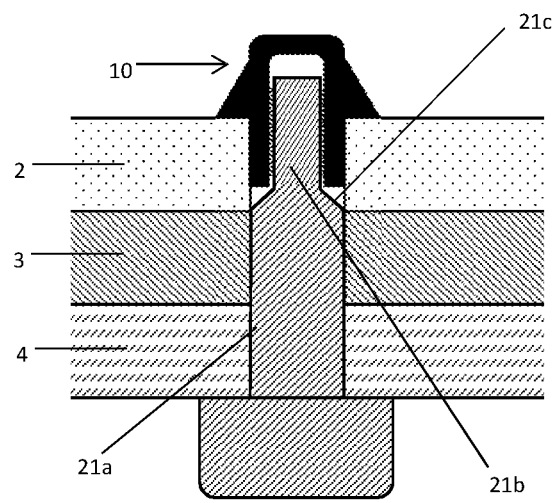
FIG. 9 shows an assembly according to a further embodiment of the invention.

FIG. 7-9 show a method of manufacturing an assembly according to an alternative embodiment of the invention. Many of the features shown in FIGS. 7-9 are identical to the features shown in FIGS. 1-6. These features are given the same reference number and will not be described again, and only the differences will be described. In this case, the bore 18 is not enlarged to form a widened hole 8 in the fitting. Instead, the captive nut 10 is force fit into a hole with the same diameter as the bore 18, as shown in FIGS. 7 and 8. This is advantageous since it means that the step of enlarging the bore 18 with a second drill bit is omitted.

The fastener shown in FIG. 9 differs from the fastener 9 of the previous embodiment in that its shaft has a relatively wide base 21a, a relatively narrow tip 21b with a threaded external surface, and a conical shoulder 21c.

Figure 16:
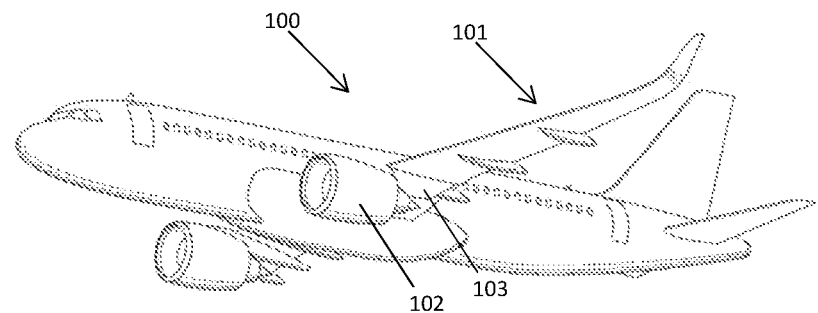
FIG. 16 shows an aircraft with an aircraft fuel tank assembly according to an embodiment of the present invention.

An aircraft 100 comprising an assembly as shown in FIGS. 1-6 is shown in FIG. 16. The aircraft has wings 101, and engines 102 suspended from the wings by pylons 103.

Figure 17:
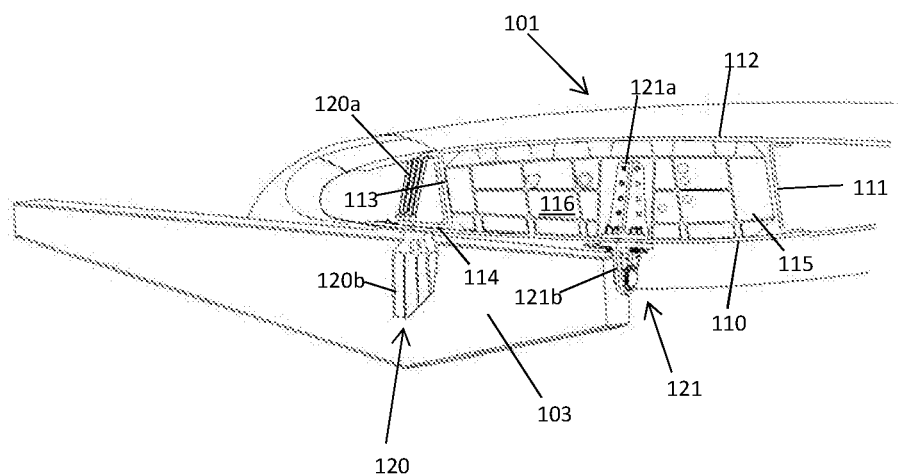
FIG. 17 shows part of a wing and pylon attachment of the aircraft of FIG. 16.
Figure 18:
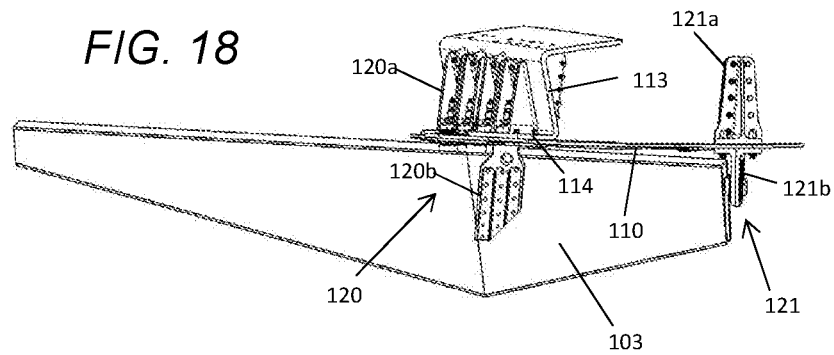
FIG. 18 shows the forward and aft suspension assemblies.

FIG. 17 shows part of one of the wings 101 in cross-section along with its associated pylon 103. The primary structure of the wing 101 is a wing box formed by a lower cover 110, a C-section rear spar 111, and a Z-section element which forms an upper cover 112, a front spar 113 and front spar flange 114 as a single element. The elements 110-114 are all formed from fibre-reinforced composite material. The wing box also has a series of ribs which run in a chordwise direction and are spaced apart along the span of the wing box, in and out of the plane of the section of FIG. 17. One of the ribs 115 is shown in FIG. 17

The wing box acts as a fuel tank, with the interior 116 of the wing box containing fuel. As shown in FIG. 17, the pylon 103 is secured to the wing box by a forward suspension assembly 120 and an aft suspension assembly 121. The forward suspension assembly 120 comprises an upper fitting 120a which is bolted to the front spar 113, and a lower fitting 120b which is bolted to the upper fitting 120a and the front spar flange 114. The aft suspension assembly 121 comprises an upper fitting 121a which is bolted to the rib 115, and a lower fitting 121b which is bolted to the upper fitting 121a and the lower cover 110.

Conventional wing boxes have manholes in their lower covers in order to provide access to the interior of the wing box. However such manholes are undesirable from a weight perspective, so the lower cover 110 has no such manholes. As can be seen from FIG. 17, the upper fitting 120a of the forward suspension assembly 120 is outside the fuel tank, so access inside the fuel tank is not required in order to secure the bolts connecting the upper fitting 120a to the lower fitting 120b. However the upper fitting 121a of the aft suspension assembly 121 is inside the fuel tank, which presents an access problem once the lower cover 110 is fitted.

Figure 19:
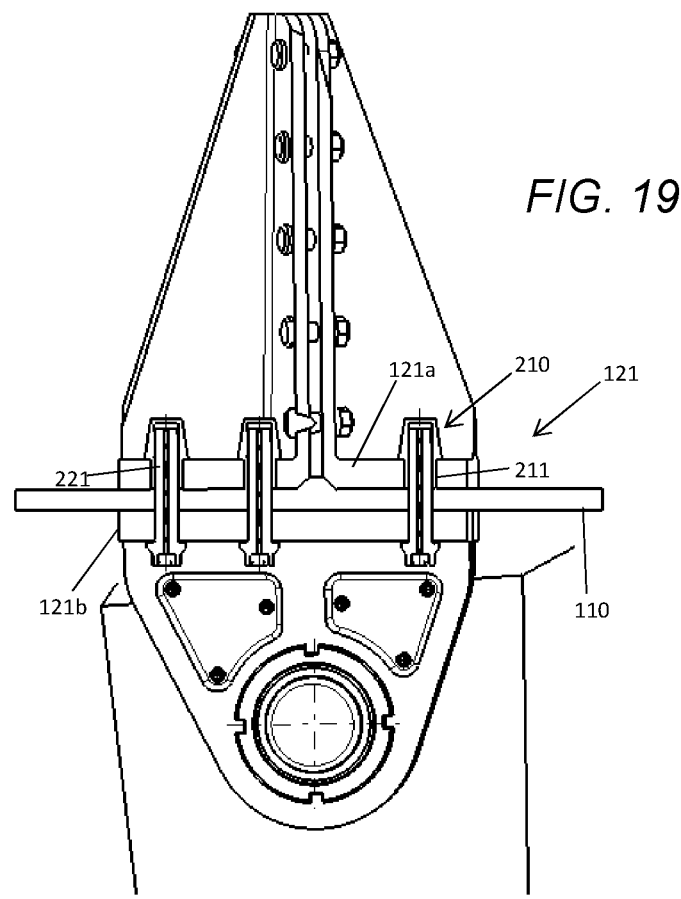
FIG. 19 is a sectional view showing three fasteners which secure the aft suspension assembly to the fuel tank.

The solution to this access problem is to use single-sided fasteners with captive nuts, of the kind shown in FIG. 1-15, 22 or 23 to secure the lower fitting 121b to the upper fitting 120a and the lower cover 110, as shown in FIG. 19.

The assembly of FIG. 19 is similar to the assembly of FIG. 6, so the same reference numbers will be used for equivalent components, incremented by 200. The lower fitting 121b is a secondary structure equivalent to the plate 4 in FIG. 1, and the upper fitting 120a and the lower cover 110 together constitute a primary structure equivalent to the fitting 2 and the panel 3 in FIG. 1.

Fasteners secure the lower fitting 121b to the fuel tank elements (the upper fitting 121a and the lower cover 110). Each fastener has a shaft 221 which passes through a full thickness of the lower fitting 121b, the lower cover 110 and the upper fitting 121a. The shaft 221 has an external thread (not shown) coupled to an internal thread (not shown) of a respective captive nut 210. The upper fitting 121a has oversized holes, and each captive nut comprises a sleeve 211 which is force fitted in a respective one of the holes with a tight interference fit between a cylindrical outer surface of the sleeve 211 and a cylindrical inner surface of the wall of the hole.

The lower cover 110 is fitted to the wing box after the upper fitting 121a has been secured to the rib 110 and the captive nuts 210 have been fitted to the upper fitting 121a. The lower fitting 121b is then secured to the wing box by pushing the shafts 221 of the bolts through the lower fitting 121b and the cover 110 and screwing them into the captive nuts 210. The interference fit provides a frictional force which prevents the captive nuts 210 from rotating as the shafts are screwed in.

Each captive nut 210 is forced into its respective hole by a force exceeding 10,000 N (10 kN). This creates a very tight interference fit which is capable of reacting the high torque created by screwing the shaft 221 into the captive nut 210, preventing the captive nut 210 from rotating.

A total of six fasteners secure the lower fitting 121b to the fuel tank—only three of the six fasteners are shown in FIG. 19. The tension load on the shaft 221 of each bolt during operation of the aircraft varies from bolt to bolt, but the highest loaded bolt will typically experience loads in service of the order of 150,000 N (150 kN). The shaft 221 of each bolt may have an outer diameter between ½ inch (12.7 mm) and 1 inch (25.4 mm). In one example the shaft 221 of each bolt has an outer diameter of the order of ¾ inch (19 mm) with an axial tensile strength of the order of 400,000 N (400 kN).

Each fastener can be assembled and tightened from outside the fuel tank, without requiring any access inside the fuel tank to grip the captive nut.

The intimate contact between the two abutting cylindrical surfaces creates a liquid-tight seal which prevents fuel from leaking out of the fuel tank through the holes in the upper fitting 121a. This tight seal also makes it unnecessary to fit a nut-cap over the captive nut 210, in order to contain plasma caused by so-called "outgassing" if lightning strikes the lower cover 110 and generates sparking at the drilled holes in the lower cover 110.

Figure 20:
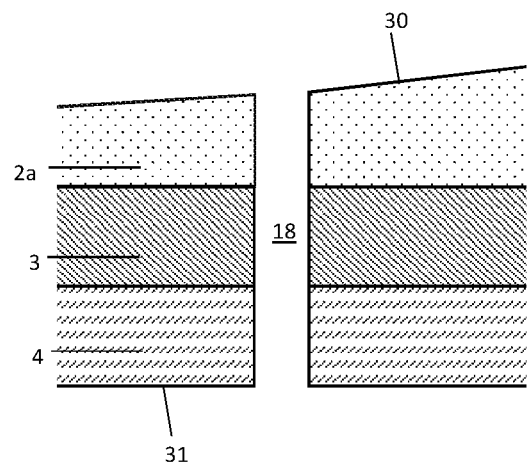
FIG. 20 shows a bore drilled in a stack with a non-parallel upper face.

FIG. 20 shows a stack similar to FIG. 2, with a fitting 2a, panel 3 and plate 4 drilled to form a bore 18 which passes through all three components. Some of the components in FIGS. 2 and 20 are identical, so the same reference numbers are used.

The stack is drilled from below, so a tool can be used to align the drill bit to be perpendicular with an outer face 31 of the plate 4. In FIG. 2 the outer face of the fitting 2 is parallel with the outer face of the plate 4, but in FIG. 20 the outer face 30 of the fitting 2a is at an oblique angle to the outer face 31 of the plate 4 which affects the seating of the nut cap shoulder. A spot-facing process is used to machine a shallow counter-bore 32 with a counter-bore face 33 parallel to the face 31, as shown in FIG. 21.

Figure 22:
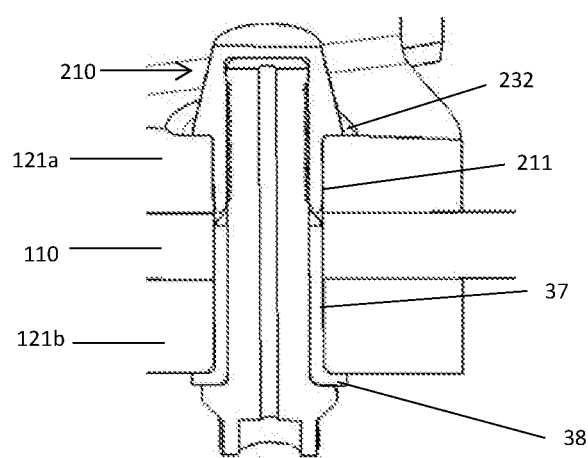
FIG. 22 is an isometric sectional view showing the stack of FIG. 21 fitted with a captive nut, bolt and sleeve.
Figure 23:
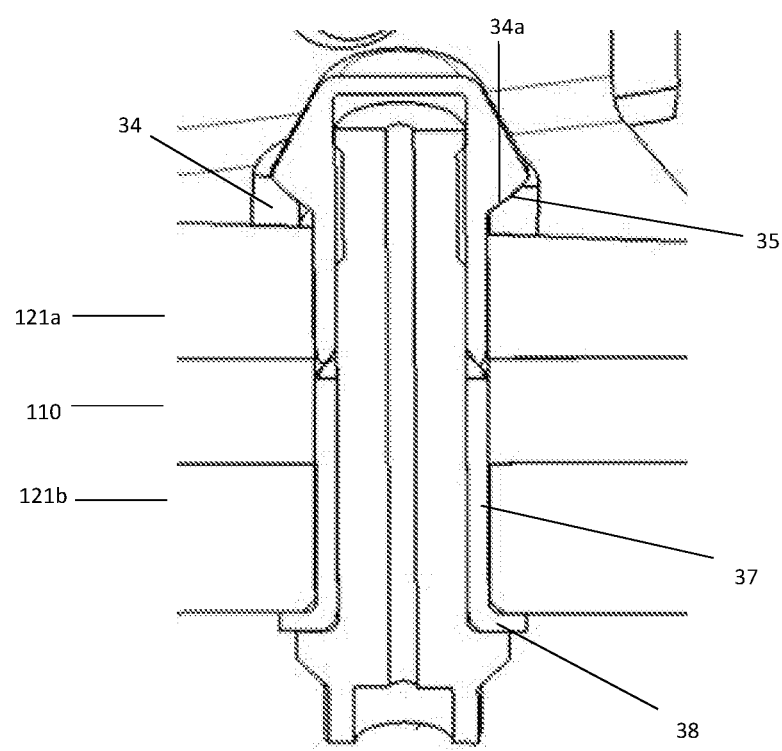
FIG. 23 is an isometric sectional view showing an assembly according to a further embodiment of the invention with a spherical washer.

FIG. 22 shows an aircraft fuel tank assembly similar to FIG. 19, so the same reference numbers will be used for equivalent components. The fastener in FIG. 22 comprises a bolt and a captive nut 210. In FIG. 22 the bore is not widened within the fitting 121a, unlike in FIG. 19 in which the bore is widened to accommodate the sleeve 211 of the captive nut 210. In FIG. 22 the shaft of the bolt has a constant diameter and is fitted with a second sleeve 37 with the same thickness as the sleeve 211 of the captive nut. The second sleeve 37 has a flange 38 that prevents it being pushed further into the bore. This is advantageous because a customised fastener as shown in FIG. 9 is not required.

Figure 21:
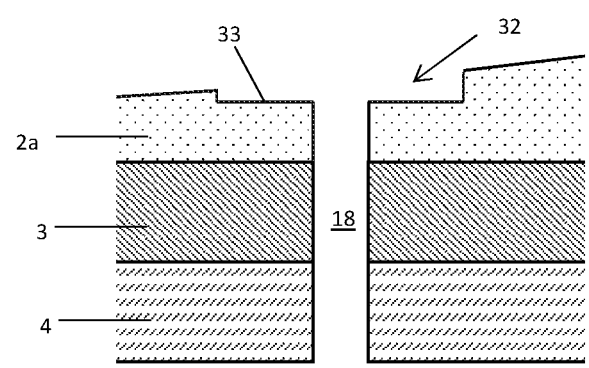
FIG. 21 shows a counter-bore formed in the stack of FIG. 20.

A counter-bore 132 is also provided in FIG. 22, similar to the counter-bore 32 shown in FIG. 21. A spherical washer 34 shown in FIG. 23 may be used to overcome the necessity of spot facing. The spherical washer 34 has a concave spherical face 34a that contacts a convex spherical face 35 of the shoulder of the captive nut. The spherical washer 34 is compressed between the shoulder of the captive nut and the fitting 121a so that the pressure is evenly distributed. The spherical washer 34 allows the captive nut to be seated securely even if the outer face of the fitting 121a is not perpendicular to the shaft of the bolt. This is advantageous since the step of creating a counter-bore 132 by spot-facing is omitted.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An assembly comprising: an aircraft fuel tank; a captive nut with an internal thread; a secondary structure; and a fastener which secures the secondary structure to the fuel tank, wherein the fastener comprises a shaft which passes through the secondary structure and has an external thread coupled to the internal thread of the captive nut, the fuel tank comprises a fuel tank element with a hole, the captive nut comprises a sleeve which is located in the hole with an interference fit between an outer surface of the sleeve and an inner surface of the wall of the hole, the inner surface of the wall of the hole has a compressed surface region next to the outer surface of the sleeve, and wherein the element is formed from a first metallic material, and the sleeve of the captive nut is formed from a second metallic material which has a higher Young's modulus than the first metallic material.

2. The assembly to claim 1, wherein the secondary structure comprises an engine pylon, a flight control surface, or a wing tip device.

3. The assembly according to claim 1, wherein the sleeve is a metallic sleeve and the fuel tank element is a metallic fuel tank element.

4. The assembly according to claim 1, wherein the secondary structure is outside the fuel tank.

5. The assembly according to claim 1, wherein the captive nut is inside the fuel tank.

6. The assembly according to claim 1, wherein the fuel tank comprises a fuel tank wall, the fuel tank element is a fitting which is inside the fuel tank and carried by the fuel tank wall, and the shaft passes through the secondary structure and the fuel tank wall.

7. The assembly according to claim 1, wherein the sleeve is a metallic sleeve with a sleeve axis; the fuel tank element is a metallic fuel tank element; the outer surface of the sleeve meets the inner surface of the wall of the hole at an interface; and the interface has a circular cross-section at all positions along the sleeve axis.

8. An assembly comprising: a primary structure; a captive nut with an internal thread; a secondary structure; and a fastener which secures the secondary structure to the primary structure, wherein the fastener comprises a shaft which passes through the secondary structure and has an external thread coupled to the internal thread of the captive nut, the primary structure comprises an element with a hole, the captive nut comprises a sleeve which is located in the hole with an interference fit between an outer surface of the sleeve and an inner surface of the wall of the hole, the inner surface of the wall of the hole has a compressed surface region next to the outer surface of the sleeve, the sleeve is a metallic sleeve with a sleeve axis, the element is a metallic element, the outer surface of the sleeve meets the inner surface of the wall of the hole at an interface, the interface has a circular cross-section at all positions along the sleeve axis, and wherein the element is formed from a first metallic material, and the sleeve of the captive nut is formed from a second metallic material which has a higher Young's modulus than the first metallic material.

9. The assembly according to claim 8, wherein the interface is cylindrical.

10. The assembly according to claim 1, wherein the interference fit provides a frictional force which is the only force which prevents the sleeve from rotating within the hole.

11. The assembly according to claim 1, wherein the shaft passes through a bore in the secondary structure which has the same diameter as the hole in which the sleeve is located.

12. The assembly according to claim 1, wherein the wall of the hole has a compressed region in contact with the sleeve.

13. The assembly according to claim 1, wherein the captive nut comprises a cap which encloses a distal end of the shaft; and a shoulder which contacts the element and acts as a stop which prevents the captive nut from being pushed further into the hole.

14. The assembly according to claim 1, wherein the captive nut comprises a first spherical surface; and the assembly further comprises a washer with a second spherical surface which contacts the first spherical surface, wherein the washer is compressed between the first spherical surface and the element.

15. The assembly according to claim 1 wherein the captive nut comprises a cap which encloses a distal end of the shaft.

16. An aircraft or aircraft wing comprising an assembly according to claim 1.

17. A method of manufacturing the assembly of claim 1, the method comprising:
    forcing the sleeve into the hole, wherein before the sleeve is forced into the hole, the inner surface of the wall of the hole has an internal dimension which is less than an equivalent external dimension of the outer surface of the sleeve; and as the sleeve is forced into the hole, the wall of the hole deforms to accommodate the sleeve and form the interference fit; and
    after the sleeve has been forced into the hole, pushing the shaft through the secondary structure and screwing the shaft into the captive nut, wherein the interference fit provides a frictional force which prevents the captive nut from rotating as the shaft is screwed into the captive nut.

18. The assembly according to claim 17, wherein the sleeve is forced into the hole by a force exceeding 1,000 N, 5,000 N or 10,000 N.

19. The assembly according to claim 17, wherein the surface of the wall of the hole is cylindrical with an inner diameter which defines the internal dimension of the hole; and the outer surface of the sleeve is cylindrical with an outer diameter which defines the equivalent external dimension of the sleeve.

20. An assembly comprising: an aircraft fuel tank; a captive nut with an internal thread; a secondary structure; and a fastener which secures the secondary structure to the fuel tank, wherein the fastener comprises a shaft which passes through the secondary structure and has an external thread coupled to the internal thread of the captive nut, the fuel tank comprises a fuel tank element with a hole, the captive nut comprises a sleeve which is located in the hole with an interference fit between an outer surface of the sleeve and an inner surface of the wall of the hole, wherein the sleeve is configured to deform the wall of the hole, and wherein the element is formed from a first metallic material, and the sleeve of the captive nut is formed from a second metallic material which has a higher Young's modulus than the first metallic material.

* * * * *